United States Patent Office 2,866,168
Patented Dec. 23, 1958

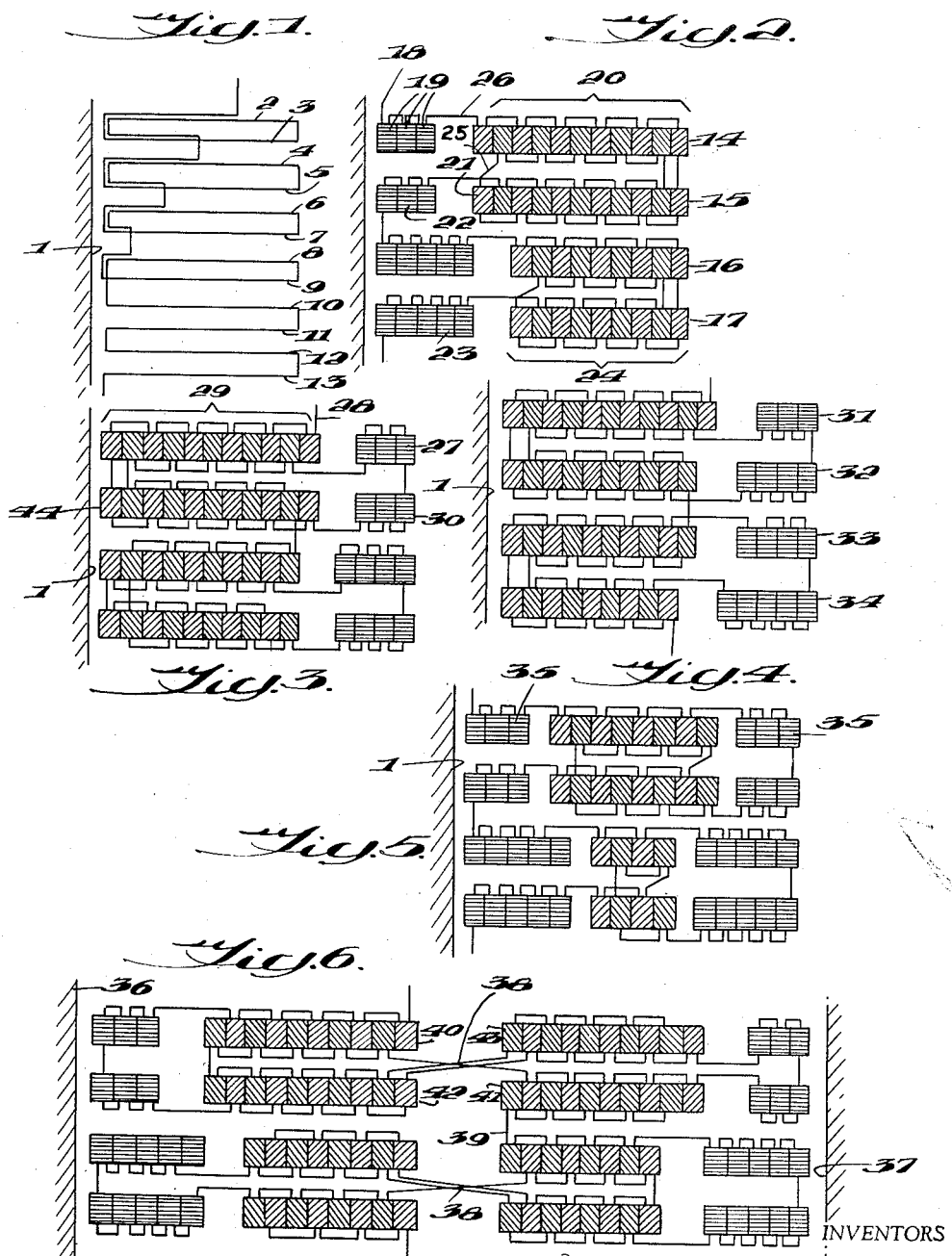

2,866,168

HIGH VOLTAGE TRANSFORMER WINDINGS WITH VOLTAGE CONTROL

Martin Christoffel, Zurich, and Anton Edlinger, Wettingen, Switzerland, assignors to Aktiengesellschaft Brown, Boveri & Cie, Baden, Switzerland, a joint-stock company Application May 3, 1956, Serial No. 582,570

Claims priority, application Switzerland May 7, 1955

4 Claims. (Cl. 336—70)

High-voltage windings in transformers are, as known, exposed to high dielectric tensions in their winding insulation caused by surge potentials having a steep wave front and the intensity of this voltage is essentially dependent on the capacitative relations.

It has been proved that the greater the ratio of winding to ground capaictance, and thus the more linear the voltage distribution along the winding, the smaller becomes said dielectric tension. However, this prerequisite does not usually exist so that special steps must be taken to improve the voltage distribution and the capacitative relations.

As known, outside of the windings between the high and low voltage windings, as well as between the high-voltage winding and ground there were provided special means, such as control rings and control coatings, metallic plates and screens to obtain a better voltage distribution when surge potentials occur. However, these steps necessarily enlarge the space required for the insulation and complicate the production by insertion of these means. If the construction is effected in a poor manner, the insulation can be impaired thereby.

Therefore, it has been recommeded to use the windings themselves for the capacitative voltage control so that the insulation between the windings, and between winding and iron can be applied in the same manner as in an uncontrolled winding. For this purpose, there are wound together coils which do not show any direct electrical connection in series. Hence, the charging current and thus the capacitative effect are increased as a result of the higher voltage between the windings.

Such windings have been constructed in the following way: It is assumed that the high-voltage winding is constructed of several concentrically arranged pancake coils disposed in superposed relation. Each pancake coil is provided with windings which are spiral. Without capacitive potential regulation, such a winding is coiled in single strand so that the superimposed windings show at the frequency of the operating voltage a reciprocal potential difference which corresponds to the voltage, induced in a winding, i. e. the winding voltage. To apply said windings to the capacitative control, it appears necessary to coil between the windings, coiled in said manner, other windings, whose potential difference, at operation voltage frequency, as compared with the windings installed, is greater than the winding voltage. This can, for example, be effected so that the windings, of such a pancake coil are arranged in dual strands and both strands show reciprocally a different potential. To obtain this potential difference, it appepars necessary to connect electrically the beginning of a strand with windings which are disposed at a point of the coil a substantial distance away from said beginning, e. g. at the end of the other strand where the required potential is formed. These connections are disposed within the winding and require, above all, at peak voltages, a particularly careful construction and additional measures from the insulation-technical and production aspects, which, however, raise the production costs.

Therefore, all efforts are made to reduce as much as possible the number of the dual strand windings. It could be considered to use dual strand only for a small winding portion, for example, the pancake coils at the beginning of the high voltage winding could be provided with double windings and the following pancake coils can be provided with uncontrolled windings, thus with one strand. However, this means a steep transition in the capacitance distribution which is undesirable, in particular, at peak voltages because of the unfavorable electric field distribution caused thereby.

According to the invention it is recommended to wind in each pancake coil in dual strands, in the manner described above, a part of a high voltage winding consisting of several pancake coils, so that there are superimposed windings whose reciprocal potential difference at operation voltage frequency amounts to a multiple of a winding voltage whereby the other part of the coil can be wound in single strands, hence, where such windings are superimposed, whose potential difference is just equal to a winding voltage, and to change inversely in successive pancakes the number of the windings coiled in double and single strands, thus, for example to reduce gradually the number of dual strand windings and to increase the number of the single-strand windings accordingly. Hereby a potential control is attained which gradually diminishes when observed from the aspect of the peak voltage reception so that the remaining part of the winding can, in known way, be made one-stranded.

Since, under the application of said arrangement according to the invention, a part of a pancake coil is constructed as single-strand winding like in uncontrolled windings, it is possible to maintain at least partly, shorter connecting lines between the strands, of the dual strand coiled windings or to drop them entirely. This depends on the position and connection of the particular parts of the pancake coil and the connection of two pancake coils disposed in adjacent planes. To save difficult connections, it is possible to obtain the required potential difference through the single strand winding part. This can be connected with dual strand coil parts in several ways. The dual strand coil part can be inserted between windings of the single-strand coil part (Fig. 2). In this case, first a portion of the single strand coil part, then the first strand of the dual strand coil part, then the second strand, and finally again a portion of the single strand coil part are wound.

However, the single strand coil part can inversely be inserted between both strands of the dual strand coil part (Fig. 3). In this case, first, one strand of the dual strand coil part, further the single-strand coil part and then the second strand are coiled.

To save further outside connections, it is suitable to combine two successive pancake coils which are disposed in different planes, to one coil pair. Then windings of both pancake coils are electrically connected together so that windings of the pancake coil, disposed closer to the high voltage connection show at operating voltage frequency a greater potential difference against the input potential than windings in the next following pancake coil. Hence, the possibility is given to lead connections which go from one winding part to the other one, through windings of the other pancake coil and thus to make the respective connection line as short as possible. The electric connection of the individual windings is then, for example, as follows (Fig. 2): In the first plane, the current appears first a single strand coil part, then it passes into the first strand of the dual strand coil part, wherefrom it proceeds in inverse direction into the next plane through the dual strand coil part disposed therein, then it proceeds upwardly again into the coil part of the first plane through the second strand and again to the second plane through the second strand to the single-strand coil part and finally into the next pancake coil.

Herein there are various construction possibilities when the gradual exchange in the number of the windings in successive pancake coils is observed. According to the invention, each pancake coil has double and single strand coiled windings. In order to obtain the shortest possible connections between the different pancake coils, the number of the windings, disposed in the particular coiling parts, is not changed in each pancake coil but they are made equal in two successive coils. Hereby it is possible to leave equal the number of the single and dual strand coiled windings in both pancake coils, combined to one coil pair, as described above (Fig. 2), and to change the number in the following coil pair, or the number of the windings can be made different within one coil pair, however, in the transition to the next coil pair, the number must be maintained constant (Fig. 3).

The pancake coils can also be composed of several parts with single strand and dual strand coiled windings, wherein, for example, one single-strand part alternates with one strand of a dual strand part (Fig. 5).

Further, it is known that the iron pillars with windings mounted thereon, can be allotted to each pole of the transformer so that several pillars must be provided; then even the winding must be divided accordingly. The invention idea can also be applied for this arrangement which shows particular advantages in the coiling technology. Then, parts of adjacent, thus in the same plane disposed pancake coils of different pillars are suitably joined by external connections. Hence, there is proceeded from one pancake coil of a pillar or a coil pair of this pillar to the pancake coil of the other pillar disposed in the same plane, and then it is continued through the next pancake coil, wherefrom it is returned to the first pillar etc. The combination of pancake coils to coil pairs proves to be also advantageous in this installation, first of all, when the communications between the pillars are interconnected in that they are led from the upper pancake coil of the one pillar to the lower pancake of the other pillar and inversely (Fig. 6). Thus it is not necessary to skip one plane during the transition to the next following coil pair.

It should also be mentioned that in the construction, corresponding to the invention, a winding need not consist only of a single conductor but also of several parallel conductors which are either directly superimposed or mutually separated by insulation.

Figures 1 to 6 explain in details the invention idea. Fig. 1 shows in a simple scheme the principal staggered construction of dual strand and single strand coil parts. Figures 2 to 6 show profiles of the winding in various embodiments according to the invention idea.

In Fig. 1, the particular windings are not represented in detail. The line 1 indicates the iron core with the winding coiled therearound. There are represented in total twelve pancake coils, which are designated with numbers 2 to 13, wherein the high voltage lead-in is connected to the beginning of coil 2. Within a pancake coil, those portions of the coils indicated by horizontal lines plotted in parallel, indicate dual strand coil parts, while a single line represents a single strand coil part. Accordingly, in the pancake coils 2 and 3 there are more dual strand coiled windings and less single strand windings than in the pancake coils 4 and 5. In the latter coils there are again more dual strand windings and less single strand windings than in the pancake coils 6 and 7 etc. Thus in this arrangement, the number of dual strand windings is gradually reduced and that of the single strand coiled windings grows so that the capacitative control diminishes gradually as measured along the complete winding from the high voltage lead-in connection to the highest coil 2. The lowest pancake coils 8 to 13 are only single-strand coiled windings.

In the following Figures 2 to 6, the particular windings themselves are also indicated. The pancake coils are represented in the profile. Each rectangle means a winding. The interrelation of the particular windings is indicated by connections designed outside of the pancake coil, although in fact the transition from one to another winding is formed by the winding spiral itself without special connecting line. Rectangles with horizontal shading indicate continuously coiled windings. Rectangles with horizontal shading represent single strand windings while rectangles with diagonal shading indicate dual strand windings. The windings belonging to one strand can easily be recognized according to the same direction of the shading and the corresponding connecting lines.

Fig. 2 shows an exemplified embodiment of the inventive idea wherein adjacent superposed pancake coils 14, 15 are interconnected to form one coil pair and superposed pancake coils 16, 17, directly below the coil pair 14, 15, are likewise interconnected to form a second coil pair, and wherein the number of the single strand and dual strand coiled windings within one coil pair is equal, and the dual strand coil part is inserted between single strand coil parts. The single strand portion 19 of coil 14 is constituted by three radially adjacent windings connected in series. The dual strand portion 20 of coil 14 is constituted by a group of radially adjacent windings in which every other winding therein as measured in a radial direction is connected in series to form one strand of the dual strand portion, the two strands being likewise series connected to each other and to the single strand portion. The high voltage lead-in to the single strand windings 19 of pancake coil 14 is designated by numeral 18, wherefrom it first proceeds through the single strand coil part 19 and then to the first strand of the dual strand coil part 20 in coil 14, wherefrom it continues into the following pancake coil 15 through the first strand and then it returns at the winding 21 to the second strand of the upper pancake coil 14, then it proceeds again to the lower coil 15, further through the second strand of dual strand coil part 20 to and through the single strand coil part 22, wherefrom it is finally transmitted to the next coil pair 16, 17. There, the number of the single strand coiled windings 23 is augmented by four and the number of the dual strand coiled windings 24 is diminished by four. The following pancake coils are not represented. In the latter coils, the number of the dual strand coiled windings diminishes further while the number of the single strand coiled windings grows. It can, particularly, be learned from this arrangement that all connections e. g. 25 and 26 in the particular pancake coils and in parts of each pancake coil need only interposed, or parallelly disposed or superimposed windings.

Fig. 3 shows an arrangement similar to that of Fig. 2 wherein the single strand coil part 27 is connected between dual strand coil parts. Here, the high voltage connection is indicated at 28, wherefrom one strand of the dual coil part 29 is coiled. It then proceeds to the next pancake coil below having the same number of single and dual stranded windings into the first strand of the dual strand wound coil part 44 and from this point to the single strand winding part 30, wherefrom it is continued to 27 in the first pancake coil and finally to the second strand of the dual strand windings 29 and 44.

In both Figures 2 and 3, the number of windings of the single strand and dual strand coil part within one coil pair, e. g. 14 and 15, is equal. In the Fig. 4 there is shown an arrangement wherein the number of windings within one coil pair is different, while in successive pancake coils 32, 33 of different coil pairs 31, 32 and 33, 34, said number of windings is equal. The winding process is almost the same, as described for Fig. 3. Even in this case, the single strand coil part is inserted between the dual strand parts.

Fig. 5 shows still another arrangement, wherein several single strand coil parts 35 are present. The dual strand coil part is here disposed in the center of each pancake coil.

Fig. 6 shows a high voltage winding which is mounted on two iron pillars 36 and 37. In this embodiment coil pairs of both pillars, disposed in the same plane are connected together. To eliminate transpositions of pancake coils, the communications 38 between the coil parts of both pillars are interconnected. The connections 38 lead either from the pancake coil 40 of the iron core 36 to the pancake 41 of the other iron core 37, or from the pancake 42 to the pancake 43. Hence, they in all cases, connect the upper pancake coil of the one pillar with the lower pancake coil of the other pillar and inversely. Thus, there arises an interconnecting of the communicating lines. In this way it is possible to establish the connection 39 to the following coil pair without crossing a pancake coil.

We claim:

1. A high voltage winding for a transformer comprising a plurality of pairs of pancake coils arranged in superposed relation, each coil of each pair of coils comprising at least one single strand portion established by a plurality of radially adjacent windings connected in series and a dual strand portion established by a group of radially adjacent windings in which the even and odd numbered windings thereon as measured in a radial direction are respectively connected in series to form first and second strands, a first strand of the dual strand portion of the first coil of each coil pair being connected directly to and in series with the first strand of the dual strand portion of the second coil of each coil pair, the second strands of the dual strand portions of said first and second coils of each coil pair being connected to each other at least indirectly and in series, all of the single strand and dual strand portions of the coils of each coil pair being connected in series, and the pairs of coils being likewise connected in series to establish a continuous transformer winding, the ratio between the single and dual strand portions of each pair of coils being progressively increased as measured in a direction away from the high voltage lead-in connection to said transformer winding thereby to effect a corresponding progressive reduction in the capacitative voltage control effect on said transformer winding established by the dual strand portions of said coils.

2. A high voltage transformer winding as defined in claim 1 wherein each coil of each coil pair comprises two single strand portions spaced radially from each other, and said dual strand portion of each such coil is disposed between said single strand portions.

3. A high voltage transformer winding as defined in claim 1 wherein the coils of each coil pair have the same number of radially adjacent windings for their single strand and dual strand portions respectively.

4. A high voltage transformer winding as defined in claim 1 wherein said plurality of pairs of pancake coils are arranged on a pair of parallel spaced pillars, there being a plurality of pairs of pancake coils on each said pillar at corresponding levels, and wherein the strands of the dual strand portions of the coils of a coil pair on one pillar are directly interconnected with the strands of the dual strand portions of the coils of the coil pair at the same level on the other pillar.

References Cited in the file of this patent
UNITED STATES PATENTS

| | | |
|---|---|---|
| 2,384,799 | Cook | Sept. 18, 1945 |
| 2,725,538 | Grimmer | Nov. 29, 1955 |

FOREIGN PATENTS

| | | |
|---|---|---|
| 127,418 | Australia | Apr. 12, 1948 |